Figure 5:
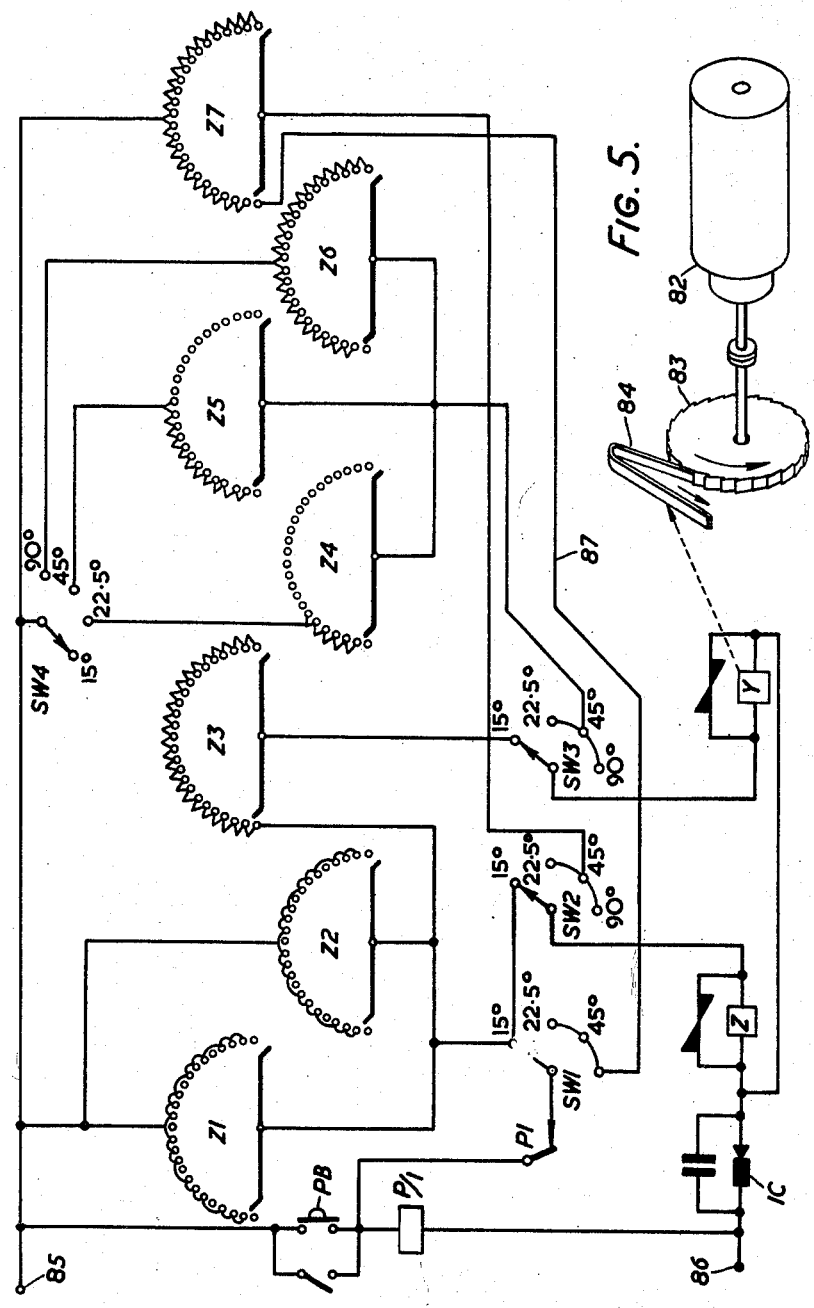

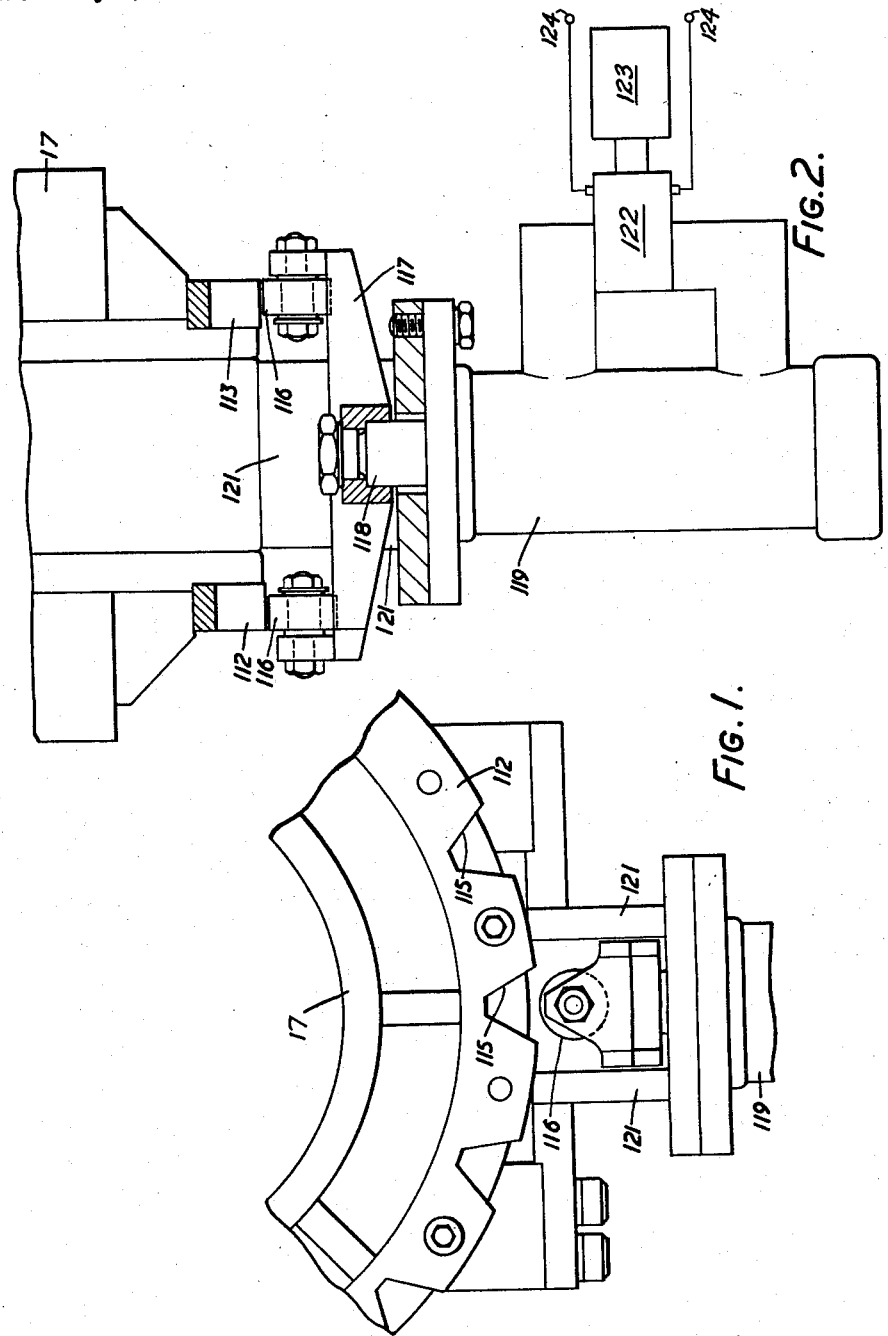

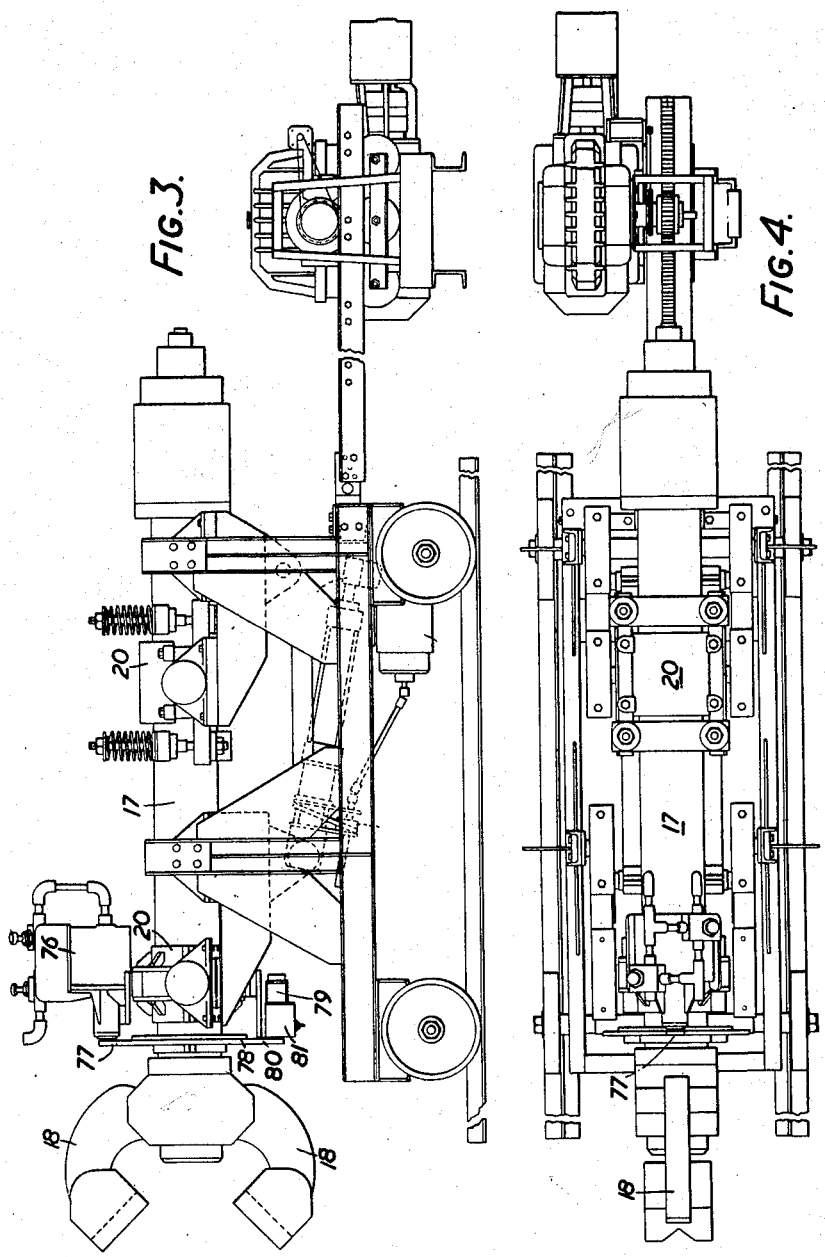

INVENTOR
JOHN IVOR TENNANT GREEN
BY Hane and Nydick
ATTORNEYS

United States Patent Office
3,170,341
Patented Feb. 23, 1965

3,170,341
POSITIONING SYSTEMS
John Ivor Tennant Green, London, England, assignor to The British Iron and Steel Research Association, London, England
Filed July 5, 1960, Ser. No. 40,786
8 Claims. (Cl. 74—822)

This invention relates to position-control apparatus and is particularly concerned with position-control apparatus for accurately positioning a rotary member. An example of the application of the invention lies in the control of the angular position of the carrier, or peel, of a manipulator used in conjunction with a forging press, the manipulator supporting and manipulating an ingot during forging thereof.

An object of the present invention is to enable a rotary member to be accurately positioned and, in accordance with one aspect of the present invention, position-control apparatus for a rotary member comprises a remote control system arranged to locate the member approximately at any one of a number of prescribed angular positions, and an indexing mechanism arranged to index the member accurately at the selected angular position when the member has been brought approximately to that position by the remote control system.

When a forging of square or polygonal cross-section is to be made, there has been difficulty in presenting the ingot to the forging tools so that its faces are parallel to the faces of the tools. To turn the ingot accurately through the required angle between passes requires a great deal of skill in the operators and, even so, it can only be accomplished at the expense of considerable time wasted.

Where the peel is arranged to be located at any one of a number of prescribed angular positions by a remote control system, for example as described in the specification of U.S. patent application Serial No. 852,272, filed on November 12, 1959 and now U.S. Patent No. 3,139,569 (hereinafter referred to as "the specification referred to"), the arrangement is usually of necessity such that there is a "dead band" at either side of each of any one prescribed angular position at which the remote control system can locate the peel. Even if the remote control system can accurately locate the peel to the desired angular position, even light disturbing torques applied during forging may shift the peel within the "dead band." As a result, the remote control system can only position the peel approximately to the desired angular location.

In accordance with a second aspect of the invention, a manipulator for supporting and manipulating an article for a pressing operation has an indexing mechanism which is arranged to operate on the manipulator and to index the article accurately to a prescribed position or to any one of a number of prescribed positions. According to this aspect, the manipulator is preferably first brought approximately to the prescribed position by a remote control system. The indexing mechanism may be arranged to yield and permit angular movement of the manipulator on the occurrence of high turning forces applied to the manipulator by the forging press. This safeguards the manipulator from damage.

Figure 6:
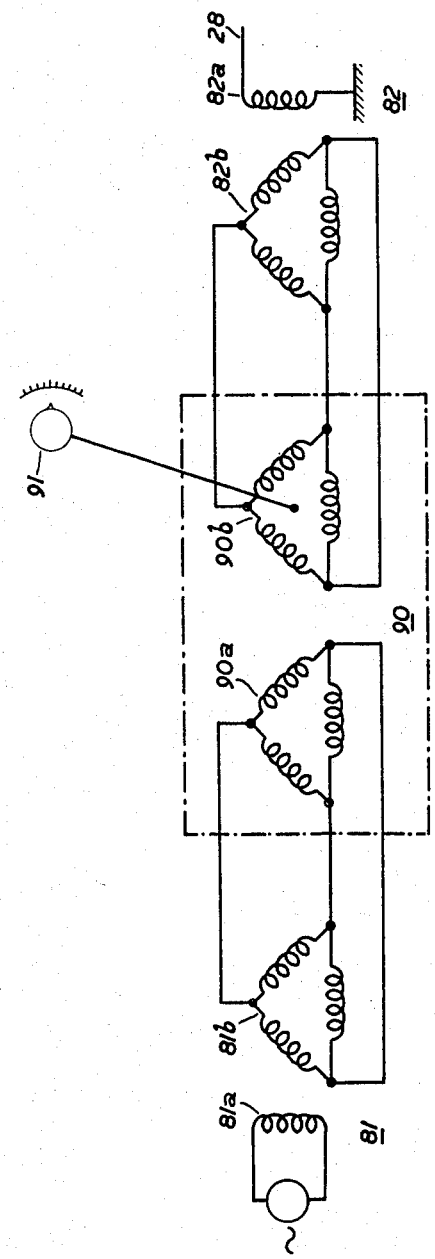

The invention wil be more readily understood by way of example from the following description of an indexing mechanism for a manipulator as described in the specification refered to, reference being made to the accompanying drawings of which FIGURE 1 is an incomplete side elevation of the indexing mechanism, FIGURE 2 is a vertical part-section taken at right angles to FIGURE 1, FIGURES 3 and 4 correspond to FIGURES 1 and 2 of the specification referred to which are respectively side and plan views of a manipulator for use in conjunction with a forging press, and FIGURES 5 and 6 correspond to FIGURES 5 and 6 of the specification referred to.

As shown in FIGURES 3 and 4, the manipulator includes a peel 17, which is supported by bearing assemblies 20 and which carries at one end a pair of jaws 18 for holding an ingot to be forged. With the use of the remote control systems described in the specification referred to, the peel 17 can be moved in the direction of its length, can be raised and lowered, and can be rotated about its longitudinal axis.

Rotation of the peel 17 about its longitudinal axis is effected by a hydraulic motor 76 arranged to drive a pinion 77 which meshes with a gear wheel 78 secured to the peel.

Gear wheel 78 also meshes with a pinion 80 on the shaft of a synchro 81 which also drives a tacho-generator 79.

As described in detail in the above mentioned specification, the motor 76 is controlled by solenoid-operated valves which are in turn controlled by relays. Control of these relays is effected by a setting synchro 82 (FIGURE 5), the output of which depends on the angular difference between it and synchro 81 and is applied to terminal 28 of a circuit generally similar to that of FIGURE 4 of the above mentioned specification. This circuit operates the control relays to cause the hydraulic motor 76 (FIGURE 3) to drive the peel until the error between the two synchros is reduced substantially to zero.

Both the output synchro 81 and the setting synchro 82 have single phase rotor windings 81a, 82a, and three phase delta stator windings 81b, 82b, as shown diagrammatically in FIGURE 6. There is additionally a differential synchro 90 having three phase stator and rotor windings 90a, 90b. The rotor of synchro 90 can be turned relative to the stator by the adjustable dial 91. Rotor winding 81a is connected to the reference source of alternating current, windings 81b, 90a are connected together as shown, as are windings 90b, 82b, while stator winding 82a is connected to a line 28 connected to the control circuit illustrated particularly in FIGURE 4 of the above mentioned specification. The initial setting of the peel is adjusted by operation of the dial 91; thereafter the peel may be rotated in a single direction only through prescribed angles by the circuit of FIGURE 5.

The circuit of FIGURE 5 is designed to cause the setting synchro 82, and hence the peel 17, to turn through any of a number of predetermined angles, which in the example given are 90°, 45°, 22½° and 15°. The shaft of the setting synchro 82 carries a ratchet wheel 83 which is driven by an electromagnetic ratchet device indicated at 84. This ratchet device 84 rotates the ratchet 83 through one tooth, each time the operating solenoid Y is pulsed. This movement of the ratchet wheel 83 is equivalent to a movement of 3¼° movement of the peel 17.

The solenoid Y is supplied with the requisite number of pulses for the required angle of movement of the peel 17 by a uniselector, the various levels of which are shown at Z1–Z7, the coil of which is shown at Z and the interruptor contacts of which are shown at IC.

The angle of movement of the peel 17 is selected by the positioning of a 4-position, multipole switch, the poles of which are shown at SW1–SW2, SW3 and SW4. When the switch SW is placed in its first position, as shown, to select an angle of 15°, and the button PB is pressed, the relay P is energised and the contacts P1 open. However, before contact P1 opens, a circuit is completed from the positive supply terminal 85, through button PB, contacts P1 switch SW1 and SW2, the uniselector coil Z and the interruptor contacts IC to the negative supply terminal 86. As a result, the uniselector rotates by one step. In levels Z1, Z2 which are connected in parallel, all the contacts are connected together, with the exception of every fourth contact. Therefore, the initial rotation of the uniselector through one step, causes the wipers in levels Z1, Z2 to be energised from the positive supply terminal 85 and to complete the circuit to coil Z and contacts IC. As a result, the solenoid Y, which is connected through switch SW3 and level Z3 in series with the wipers Z1, Z2 and the interruptor contacts IC, is supplied with four pulses and the synchro is rotated through an angle equal to four teeth of the ratchet wheel 83, i.e. 15°. After the uniselector has rotated through four steps, the wipers in level Z1, Z2 reach a contact which is not connected to terminal 85 and further stepping of the synchro stops.

When the switch SW is placed on any of the other three positions, corresponding to angles of 22½°, 45° and 90°, the coil Z and the contacts IC are pulsed through a circuit from terminal 85, button PB, contacts P1, switch SW1, a line 87, the first contact of level Z7, switch SW2, to the coil Z and contacts IC. The uniselector rotates through one step and, as the remaining contacts of level Z7 are connected to terminal 85, the uniselector continues to step through all its contacts until it returns to the first contact. The solenoid Y is connected through switch SW3 to the wipers of levels Z4, Z5, Z6. In level Z4 the second to seventh contacts are connected to switch SW4, so that when switch SW is placed in the 22½° position, six pulses are applied by level Z4 to the solenoid Y and the synchro 82 is rotated through 22½°. Similarly, when switch SW is in either the 45° or 90° position, 12 or 24 pulses, respectively, are applied to the solenoid Y and the synchro is rotated through 45° and 90° respectively.

Referring now to FIGURES 1 and 2, the peel 17 has bolted to it, at a position adjacent to one of the two bearing assemblies 20 of the specification referred to, a pair of parallel plates 112 and 113.

Each of the plates 112, 113 is provided with profiled notches 115 positioned with a high degree of precision at suitable angular intervals, for example 22½ degrees, corresponding to the smallest angle through which the peel and therefore the ingot can be turned by the control system of FIGURES 5 and 6.

To that one of the bearing assemblies 20 which lies adjacent to the plates 112 and 113, is secured the hydraulic ram 119 of an indexing assembly. The indexing assembly includes an indexing member in the form of a pair of detents each having a roller head 116. The roller heads 116 are carried on a carriage 117 which in turn is secured to the piston 118 of the hydraulic ram 119. The carriage 117, and hence the roller heads 116, are guided in their movement towards and away from the circular plates 112, 113 by guide plates 121 located one at each side of the carriage 117.

The hydraulic ram 119 is double-acting, the hydraulic fluid being supplied from a constant-pressure source indicated schematically by the rectangle 123 which source may take any known form. The hydraulic fluid in ram 119 may be returned to source 123 when piston 118 is displaced in the ram. The piston 118 can thus reverse while maintaining engaging force on the roller heads 116, and thereby gives a normal positive locating action when operated in conjunction with the notched plates 112, 113. As a result of the use of a constant-pressure source, there will be a yielding and restoring characteristic when the peel is subjected to any force equivalent to a larger back pressure than the source pressure. The supply of hydraulic fluid to the ram 119 is controlled by a solenoid valve of which the valve and control circuits therefor are of any convenient known construction and arrangement and are indicated schematically by the rectangle 122. The control circuits extend to terminals 124 by which they are interlocked electrically with the remote control system for the angular positioning of the peel 17. The interlocking is such that rotation of the peel takes place only when the roller heads 116 are in the retracted position shown in FIGURES 1 and 2, and such that engagement of the detent mechanism with the notches 115 takes place automatically only after the rotation has ceased.

In operation, the remote control system of FIGURES 5 and 6 positions the peel within the "dead band" limits, for example within 5 degrees of the required angular position. The ram 119 is then automatically actuated to engage the roller heads 116 with the adjacent notches 115 of the plates 112, and thereby, if necessary, rotates the peel slightly to locate the peel accurately at the required angular position. On the subsequent forging operation, the indexing mechanism provides a limited positive force for retaining the peel in the required angular position, but if, for example, the ingot is out of square so that the peel is subjected to high rotational forces by the forging tools, the roller heads 116 are forced partially out of engagement with the notches 115 against the action of the ram 119. In other words, the indexing mechanism yields to permit movement of the peel and to prevent the manipulator being overturned. When the forces applied by the forging tools are removed, the roller heads 116 fully re-engage in the notches 115, and thereby accurately re-position the peel before the next angular movement occurs; as a result, cumulative errors in the positioning system are avoided. Lastly, the ram 119 is arranged to withdraw the roller heads 116 from the notches 115 before the remote control system is operated to locate the peel at another angular position.

While two indexing plates 112 and two detent mechanisms 116 to 119 have been illustrated in the accompanying drawings, it will be understood that a single indexing plate and a single detent mechanism may be employed, if so desired.

With the indexing mechanism as described, the choice of angular positions at which the ingot can be gripped by the jaws of the manipulator is limited to certain prescribed values. In modifications of the invention, provision may be made for adjusting the angular position of the jaws of the manipulator relatively to the peel, and/or for adjusting the angular position of the detent mechanism about the axis of the peel. In either case, the magnitude of the maximum possible angular adjustment of the jaws or detent, in each direction of rotation, is preferably made equal to half the angular extent of the openings between the notches 115. Such adjustment ensures that the indexing mechanism can be set accurately to any angular position required for the gripping of the ingot.

I claim:

1. A detent mechanism for accurately positioning a rotary member at a prescribed angular position, said mechanism comprising a detent mounted for movement along a fixed longitudinal axis, means for displacing said detent along said axis and for yieldably urging said detent into operative relationship with said rotary member with a substantially constant force, and means on said rotary member and said detent cooperating with one another to permit displacement of said detent along its longitudinal axis in opposition to said substantially constant force, such displacement being in response to a turning force acting on said rotary member greater than a predetermined value.

2. A detent mechanism for accurately positioning a rotary member at a prescribed angular position, said mechanism comprising a detent mounted for movement along a fixed longitudinal axis, first means for displacing said detent along said axis, control means releasing the detent for movement into operational relationship with the rotary member only when said member is stationary, and second means on said rotary member and said detent cooperating with one another to position said rotary member accurately at prescribed angular positions as the detent is displaced in one direction and to permit displacement of said detent in the opposite direction in response to a turning force acting on said rotary member greater than a predetermined value.

3. A detent mechanism for accurately positioning a rotary member at a perscribed angular position, said mechanism comprising a detent mounted for movement along a fixed longitudinal axis, first means for displacing said detent along said axis and for yieldably urging said detent into operative relationship with said rotary member, control means releasing the detent for movement into operational relationship with the rotary member only when said member is stationary, and second means on said rotary member and said detent means cooperating with one another to permit displacement of said detent along its longitudinal axis in opposition to said yieldable force, such displacement being in response to a turning force acting on said rotary member greater than a predetermined value.

4. A detent mechanism as claimed in claim 1, wherein said cooperating means on the rotary member and detent comprises a number of notches formed on the periphery of the rotary member, said notches being so profiled that a turning force acting on said rotary member causes a force to be transmitted to said detent, the line of action of said force being substantially parallel to the longitudinal axis of said detent.

5. A detent mechanism as claimed in claim 4, wherein each notch is wedge shaped.

6. A detent mechanism as claimed in claim 5, wherein said detent has a roller head for engaging any one of said notches.

7. A detent mechanism for accurately positioning a rotary member at any selected one of a number of prescribed angular positions, comprising a detent displaceable along a first axis disposed substantially at right angles to the axis of rotation of said rotary member and having at one end thereof a roller head for engaging any one of a number of wedge shaped notches formed on the periphery of said rotary member, and means for displacing said roller head into and out of engagement with said notch, which displacing means includes a fluid source under constant pressure for allowing said detent to yield along a second axis substantially coincident with said first axis in response to a turning force acting on said rotary member greater than a predetermined value.

8. A detent mechanism as claimed in claim 7, wherein the rotary member is the peel of a forging manipulator.

References Cited by the Examiner

UNITED STATES PATENTS

| | | | |
|---|---|---|---|
| 1,788,423 | 1/31 | Drissner et al. | 74—822 X |
| 1,809,444 | 6/31 | Greve. | |
| 1,821,739 | 9/31 | Cramer. | |
| 2,029,587 | 2/36 | Rode. | |
| 2,672,773 | 3/54 | Schofield. | |
| 2,887,905 | 5/59 | Reynolds | 74—84 X |
| 2,909,940 | 10/59 | Dawkins | 74—527 |

FOREIGN PATENTS 590,532   6/60   Canada.

BROUGHTON G. DURHAM, *Primary Examiner.*